United States Patent

Waldmann et al.

[11] Patent Number: 5,541,891
[45] Date of Patent: Jul. 30, 1996

[54] DISTANCE SENSING DEVICE

[75] Inventors: Bernd Waldmann, Esslingen; Djunarato Kusuma, Rödental, both of Germany

[73] Assignee: Reitter & Schefenacker GmbH & Co. KG, Esslingen, Germany

[21] Appl. No.: 409,316

[22] Filed: Mar. 23, 1995

[30]  Foreign Application Priority Data

Mar. 26, 1994 [DE] Germany ............................ 44 10 617.3

[51] Int. Cl.⁶ .................................................... G01S 15/93
[52] U.S. Cl. ............................ 367/99; 367/909; 367/110
[58] Field of Search ........................................ 367/909, 902, 367/99, 112, 107, 110, 111

[56] References Cited

U.S. PATENT DOCUMENTS

| | | | |
|---|---|---|---|
| 4,290,043 | 9/1981 | Kaplan | 367/909 |
| 4,561,064 | 12/1985 | Brüggen et al. | 367/902 |
| 5,059,946 | 10/1991 | Hollowbush | 367/909 |

Primary Examiner—Daniel T. Pihulic
Attorney, Agent, or Firm—Robert W. Becker & Associates

[57]  ABSTRACT

A distance sensing device for a motor vehicle, positioned at the rear of the motor vehicle, for sensing a distance to an obstacle to the rear of the motor vehicle, has a brake light unit positioned in the interior of the motor vehicle at the rear window. At least one sensor for sensing the distance is provided. An optical display unit located within the brake light unit is provided, and the at least one sensor is connected to the optical display unit.

11 Claims, 4 Drawing Sheets

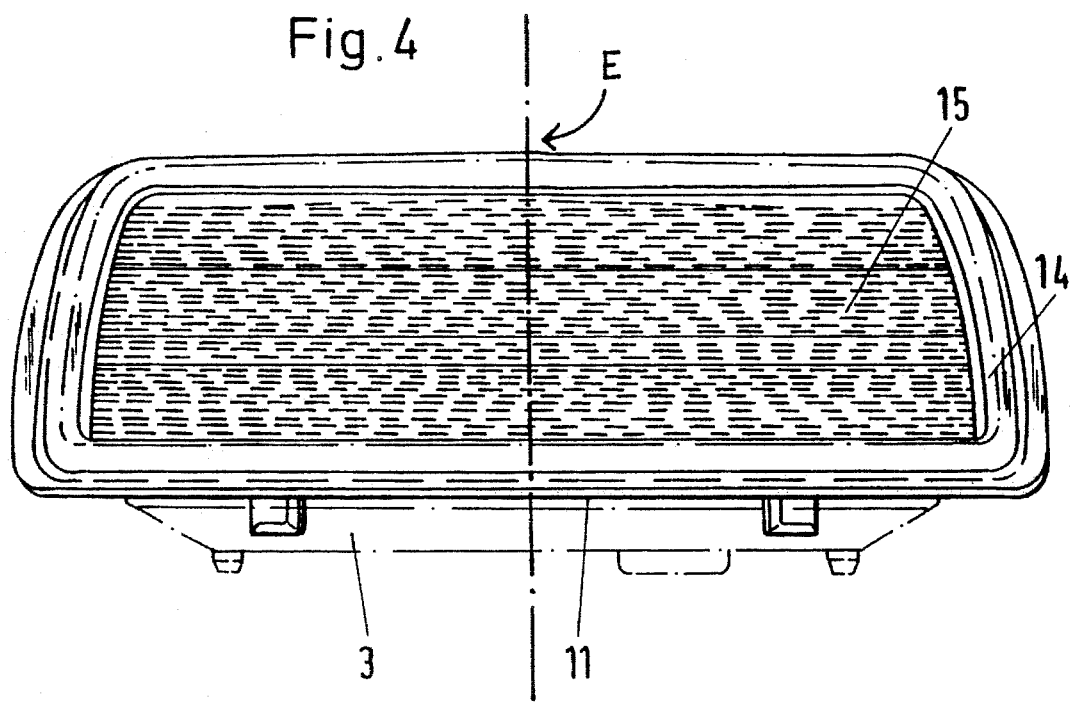
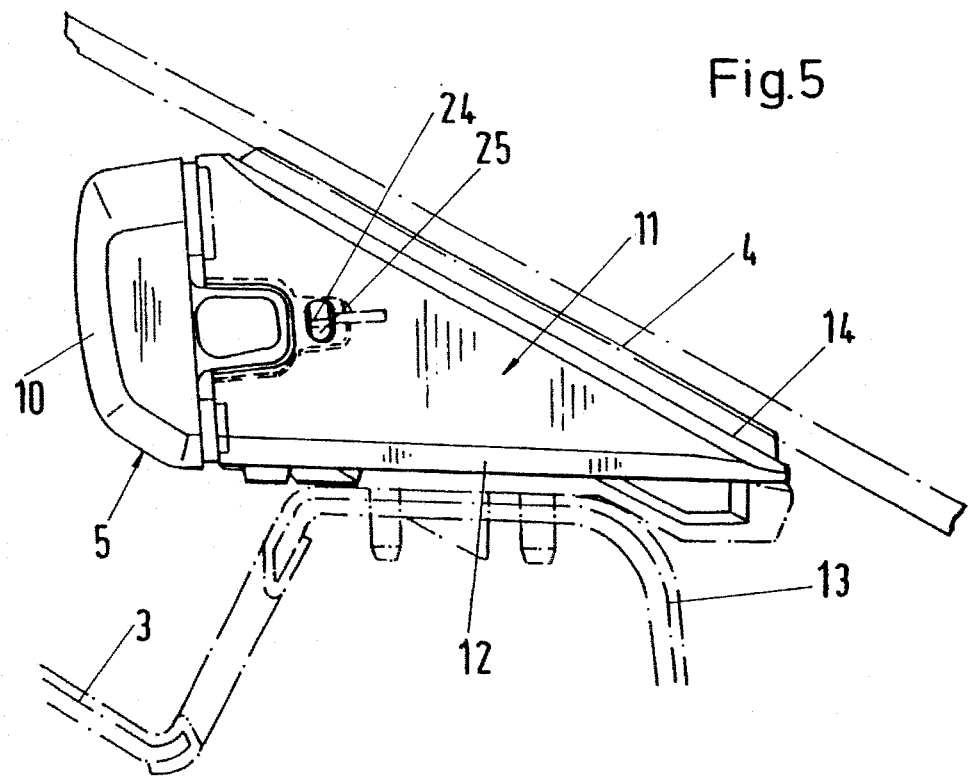

DISTANCE SENSING DEVICE

BACKGROUND OF THE INVENTION

The present invention relates to a distance sensing device, located in the rear area of the vehicle for sensing the distance of a vehicle from an obstacle; the distance sensing device is provided with at least one distance sensor that is connected with an optical display unit located in the interior of the vehicle.

It is known to provide ultrasound sensors in the rear area of a vehicle by which the distance from an obstacle to the rear of a vehicle can be measured. In the interior of the vehicle an optical and/or acoustical warning device is provided which indicates to the driver, how far away the obstacle still is. The respective indication/sensing units, as well as the respective electronic components are installed in separate casings in the vehicle. With this known solution it is disadvantageous that separate casings are required for the different parts of this distance sensing device. Thus, manufacturing the distance sensing device is correspondingly complicated and expensive. Moreover, the installation of the distance sensing device is complicated because of the numerous component parts.

It is therefore an object of the present invention to improve a distance sensing device of this kind such that it can be manufactured easily and cost-efficiently and can be installed in the vehicle easily while requiring the smallest possible space.

SUMMARY OF THE INVENTION

A distance sensing device for a motor vehicle, positioned at the rear of the motor vehicle, for sensing a distance to an obstacle to the rear of the motor vehicle, according to the present invention is primarily characterized by:
- a brake light unit positioned in the interior of the motor vehicle at the rear window;
- at least one sensor for sensing the distance; and
- an optical display unit located within the brake light unit, wherein the at least one sensor is connected to the optical display unit.

The brake light unit comprises a cover and the optical display unit is located in the cover.

The brake light unit further comprises a casing and wherein the cover is connected to the casing by a snap connection.

The optical display unit comprises a control device that is positioned within the casing.

The optical display unit comprises an indicator member located within the cover. The indicator member comprises at least two indicator fields, each having a different color.

Preferably, the distance sensing device comprises three of the indicator fields positioned adjacent to one another.

The distance sensing device may further comprise an acoustic signalling device coupled with the optical display unit. Advantageously, each indicator field has coordinated therewith a different acoustic signal. The acoustic signal may be a single sound signal or a sound signal sequence.

The optical display unit further comprises an indicator element for each of the indicator fields positioned within the casing. Expediently, the indicator element is an LED (light emitting diode).

The optical display unit further comprises a printed circuit board arranged within the casing. The indicator elements are preferably connected to the printed circuit board.

The optical display unit of the inventive distance sensing device is mounted inside the brake light unit, as a result of which no additional casing for the display unit is required. Thus the distance sensing device can be manufactured and installed easily and cost-efficiently. Also the electronic components required for the distance sensing device can be easily installed within the brake light unit, as a result of which manufacturing and installing of the distance sensing device are facilitated and no separate mounting space is required.

BRIEF DESCRIPTION OF THE DRAWINGS

The object and advantages of the present invention will appear more clearly form the following specification in conjunction with the accompanying drawings, in which:

FIG. 4 illustrates the brake light unit according to FIG. 3, viewed in the direction of the arrow IV of FIG. 3; and FIG. 5 illustrates a side view of the brake light unit with the display unit.

DESCRIPTION OF PREFERRED EMBODIMENTS

Figure 1:
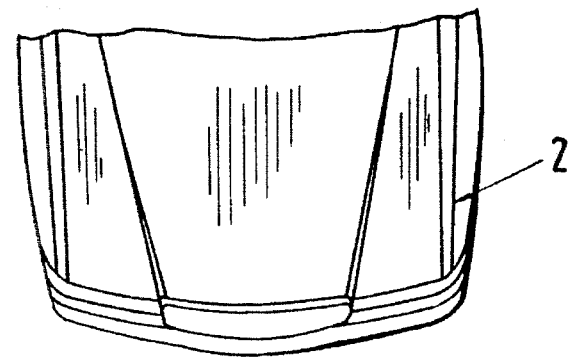
FIG. 1 illustrates a plan view of a vehicle provided with an inventive distance sensing device.
Figure 1:
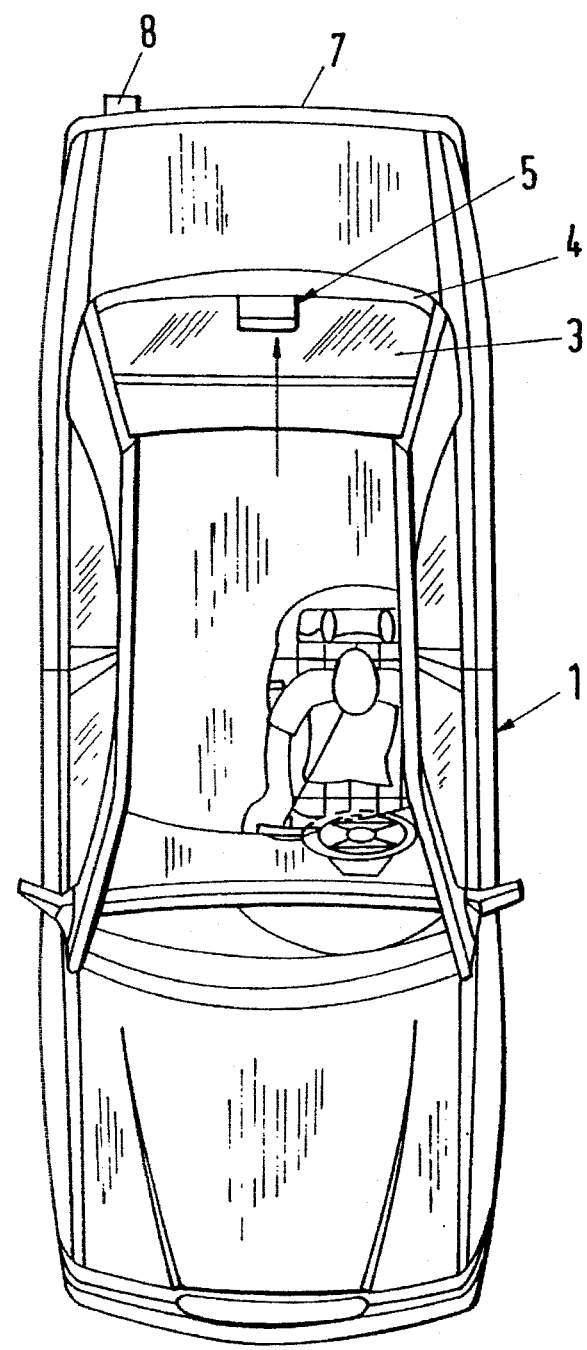
Figure 2:
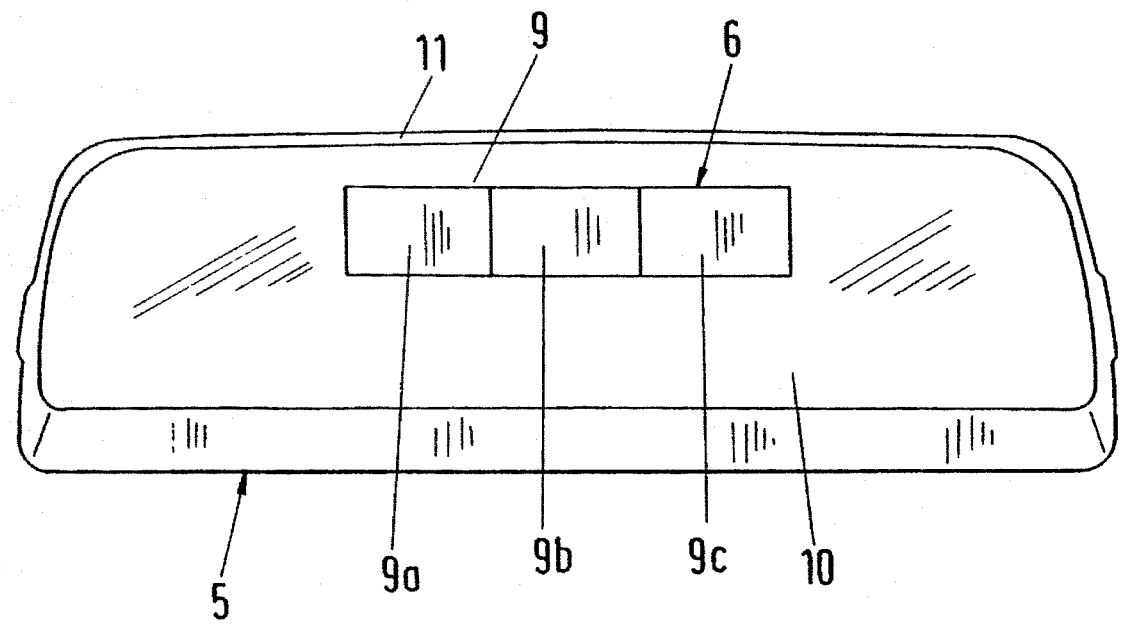
FIG. 2 illustrates a brake light unit of a vehicle, into which a measuring unit of the inventive distance sensing device is installed, viewed in the direction of the arrow II of FIG. 3.
Figure 3:
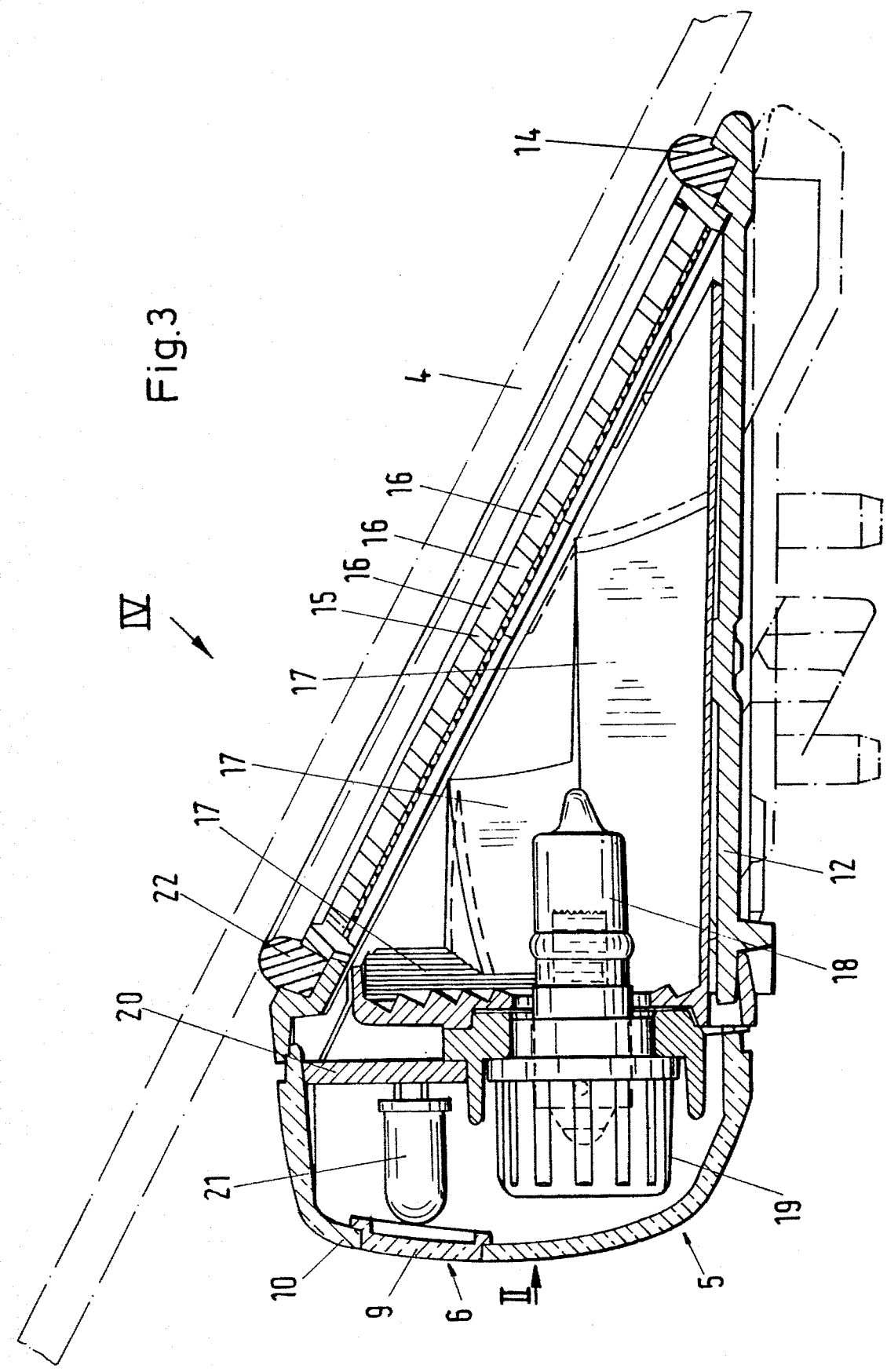
FIG. 3 illustrates the brake light unit with the display unit in an enlarged view and in a longitudinal section.

FIG. 1 illustrates two vehicles 1 and 2, positioned one behind the other. In the interior of the first vehicle, a brake light unit 5 is provided, located at an upper level in the rear area. It is preferably mounted on a rear window ledge 3 and abuts the rear window 4 of the vehicle (FIG. 3). The brake light unit 5 is provided with an optional display unit 6 that displays the distance to a vehicle 2 to the rear when the vehicle 1 is backing up. The distance from the vehicle 2 in the rear is measured by an ultrasound or infrared sensor 8, only schematically illustrated in FIG. 1, which is provided in the rear area, preferably at the bumper 7, and a corresponding signal is sent to the display unit 6 via an electronic device (not illustrated) known per se. The display unit 6 and the sensor 8 are parts of the distance sensing device which can be employed particularly as a help for parallel parking. The display unit 6 provides an indicator member 9 embodied as an optical window (FIG. 2) which is integrated in a cover 10 of the casing 11 of the brake light unit 5. The brake light unit casing 11 has a bottom 12 with which it is attached to the rear window ledge 3, respectively, to a frame 13 (FIG. 5) on which the rear window ledge 3 itself is mounted. As is illustrated in FIG. 3, the brake light unit casing 11 abuts the rear window 4 with a damping ring 14 that surrounds an optical window 15. Furthermore, the damping ring 14 acts as a shield of the brake light unit preventing its light from falling into the interior of the vehicle. The optical window 15 is provided with lens elements (16) in a manner known per se (FIG. 3). A stepped reflector 17, a incandescent bulb 18 with a lamp fixture 19 for the brake light unit 5, and a printed board 20 are provided in the casing 11. At the printed circuit board 20 the optical indicator elements are provided, like LEDs, incandescent bulbs, and the like, which are located behind the indicator member 9 that is embodied as an optical window. The printed board 20 can also be provided in the cover 10.

The casing 11 and the cover 10 are connected by a snap connection in the form of locking members 24, 25 so that the electronic components, respectively, the incandescent bulb of the brake light unit is easily accessible.

The indicator member 9 extends in the longitudinal direction of the cover 10 and is preferably positioned symmetrically to the cross center plane E of the casing 11. As is illustrated in FIG. 2, the indicator member 9 is positioned at a short distance from the lower cover edge. The indicator member 9 is provided with three rectangular window sections 9a to 9c preferably of the same size which have different colors, namely red, yellow, and green. The optical indication can preferably be connected with an acoustic signalling device. For example, different sound signals or signal sequences could be provided when the different indicator fields light up: for example, when the first indicator field 9a lights up which, for example, is red, a continuous sound signal could be emitted; when the central, yellow, indicator field 9b lights up, several beeps could be emitted; and when the third, green window section 9c lights up, a single beep could be emitted. The driver of the vehicle 1 thus receives optimal information about how large the distance is between the vehicle 1 and the vehicle 2 in the rear. If this distance is still sufficiently large, the green window section 9c lights up. In case of an additional acoustical indication a single beep is audible. If the distance to the vehicle 2 in the rear diminishes, for example, if it is 0.5 m, then the yellow window section 9b lights up. Additionally several beeps can be audible. If the distance is very low, for example only 15 cm, then the red window section 9a lights up. Simultaneously, the continuous sound signal can be audible in case that an acoustic indication is provided. Then the driver knows that he has to stop his vehicle.

When backing up, the distance of the vehicle 1 from any obstacle whatsoever can be measured by the sensor 8. The control system required for the sensor 8 is provided on the printed board 20 and is embodied in a manner known per se and thus is not described in detail. The electric power supply of the distance sensing device is provided by the vehicle battery. However, it is also possible to provide an accumulator for the electric power supply of the distance sensing device.

Since the indicator member faces the driver, he is able to recognize the optical indication easily on backing up by either observing it through the interior rear-view mirror or by turning his head in order to have a direct view of the optical display unit 6. Thus, for example, even unexperienced drivers are enabled to safely park in a short parking gap.

Since the display unit 6 is mounted inside the brake light unit casing 11, no separate casing is required for the display unit 6. Manufacturing costs and additional mounting space can thus be saved. A wiring connection between the display unit 6 and its electronic compounds is obsolete since the electronic components are provided on the printed board 20.

The electronic components on the printed board 20 and the display unit 6 are supplied with electric power separately from the brake light unit 5 connected to the (not illustrated) break pedal in a manner known per se. The display unit 6 and the corresponding electronic components are activated when the driver shifts into reverse.

The present invention is, of course, in no way restricted to the specific disclosure of the specification, examples, and drawings, but also encompasses any modifications within the scope of the appended claims.

What we claim is:

1. A distance sensing device for a motor vehicle, positioned at the rear of the motor vehicle, for sensing a distance to an obstacle to the rear of the motor vehicle, said distance sensing device comprising:

a brake light unit positioned in the interior of the motor vehicle at the rear window;

at least one sensor for sensing the distance;

an optical display unit located within said brake light unit, wherein said at least one sensor is electrically connected to said optical display unit;

wherein said brake light unit comprises a casing with a cover, said cover comprising a lamp fixture for an incandescent light bulb of said brake light unit;

wherein said optical display unit is located in said cover;

wherein said cover is detachably connected to said casing by a snap connection and is located remote from the rear window;

wherein said optical display unit comprises an indicator member located within said cover; and wherein said optical display unit further comprises at least one indicator element positioned within said casing so as to be aligned with said indicator member.

2. A distance sensing device according to claim 1, wherein said optical display unit comprises a control device, said control device positioned within said casing.

3. A distance sensing device according to claim 1, wherein said indicator member comprises at least two indicator fields, each having a different color.

4. A distance sensing device according to claim 3, comprising three of said indicator fields positioned adjacent to one another.

5. A distance sensing device according to claim 3, further comprising an acoustic signalling device coupled with said optical display unit.

6. A distance sensing device according to claim 5, wherein each of said indicator fields has coordinated therewith a different acoustic signal.

7. A distance sensing device according to claim 6, wherein said acoustic signal is a single sound signal.

8. A distance sensing device according to claim 6, wherein said acoustic signal is a sound signal sequence.

9. A distance sensing device according to claim 3, wherein said optical display unit one of said indicator elements for each of said indicator fields positioned within said casing.

10. A distance sensing device according to claim 9, wherein said indicator element is an LED.

11. A distance sensing device according to claim 9, wherein:

said optical display unit further comprises a printed circuit board arranged within said casing; and said indicator elements are connected to said printed circuit board.

* * * * *

UNITED STATES PATENT AND TRADEMARK OFFICE
CERTIFICATE OF CORRECTION

PATENT NO. : 5,541,891
DATED : July 30, 1996
INVENTOR(S) : Waldmann et al

It is certified that error appears in the above-indentified patent and that said Letters Patent is hereby corrected as shown below:   On title page, Item
[75]   Inventors:   Bernd Waldmann, Esslingen;
Djuanarto Kusuma, Rödental, both of Germany Signed and Sealed this Fifth Day of November, 1996

Attest:

BRUCE LEHMAN

Attesting Officer      Commissioner of Patents and Trademarks